United States Patent [19]

Berger

[11] Patent Number: 4,599,173

[45] Date of Patent: Jul. 8, 1986

[54] CLEANING FLUID VESSEL FOR IMMERSION OF CARTRIDGE-TYPE FILTER MEDIA

[76] Inventor: Dirck V. Berger, 3861 Peabody Dr., Bloomfield Hills, Mich. 48013

[21] Appl. No.: 617,980

[22] Filed: Jun. 6, 1984

[51] Int. Cl.$^4$ ................. B01D 27/12; B01D 29/38; B01D 41/00

[52] U.S. Cl. ....................... 210/451; 210/453; 210/455; 210/497.01; 134/166 R; 134/169 A

[58] Field of Search ............ 210/791, 106, 198.1, 210/212, 221.2, 237, 238, 244, 248, 407, 409, 410, 413, 414, 416.1, 436, 448, 452, 453, 455, 470, 451; 134/166 R, 167 R, 168 R, 169 R, 169 A, 172, 199

[56] References Cited

U.S. PATENT DOCUMENTS

| | | | |
|---|---|---|---|
| 3,044,475 | 7/1962 | Thompson | 134/166 R |
| 3,413,988 | 12/1968 | Butler | 134/166 R |
| 3,438,497 | 4/1969 | Maestrelli | 210/791 |
| 3,566,892 | 3/1971 | Logue | 134/166 R |
| 3,583,413 | 6/1971 | Mertzanis | 134/166 R |
| 3,820,552 | 6/1974 | Lang et al. | 210/409 |
| 4,276,914 | 7/1981 | Albertson | 134/169 A |
| 4,443,344 | 4/1984 | Wyse | 210/791 |

Primary Examiner—Richard V. Fisher
Assistant Examiner—Wanda L. Millard
Attorney, Agent, or Firm—Charles Edward Neff

[57] ABSTRACT

A vessel for immersion of cartridge-type filter media in a cleaning fluid. The vessel conforms to the external periphery of the cartridge-type filter media thereby minimizing the amount of cleaning fluid required to immerse the cartridge-type filter media. The vessel also features an automatic centering device which locates the cartridge-type filter media within the vessel thereby assuring uniform exposure of the cartridge-type filter media to the cleaning fluid.

4 Claims, 5 Drawing Figures

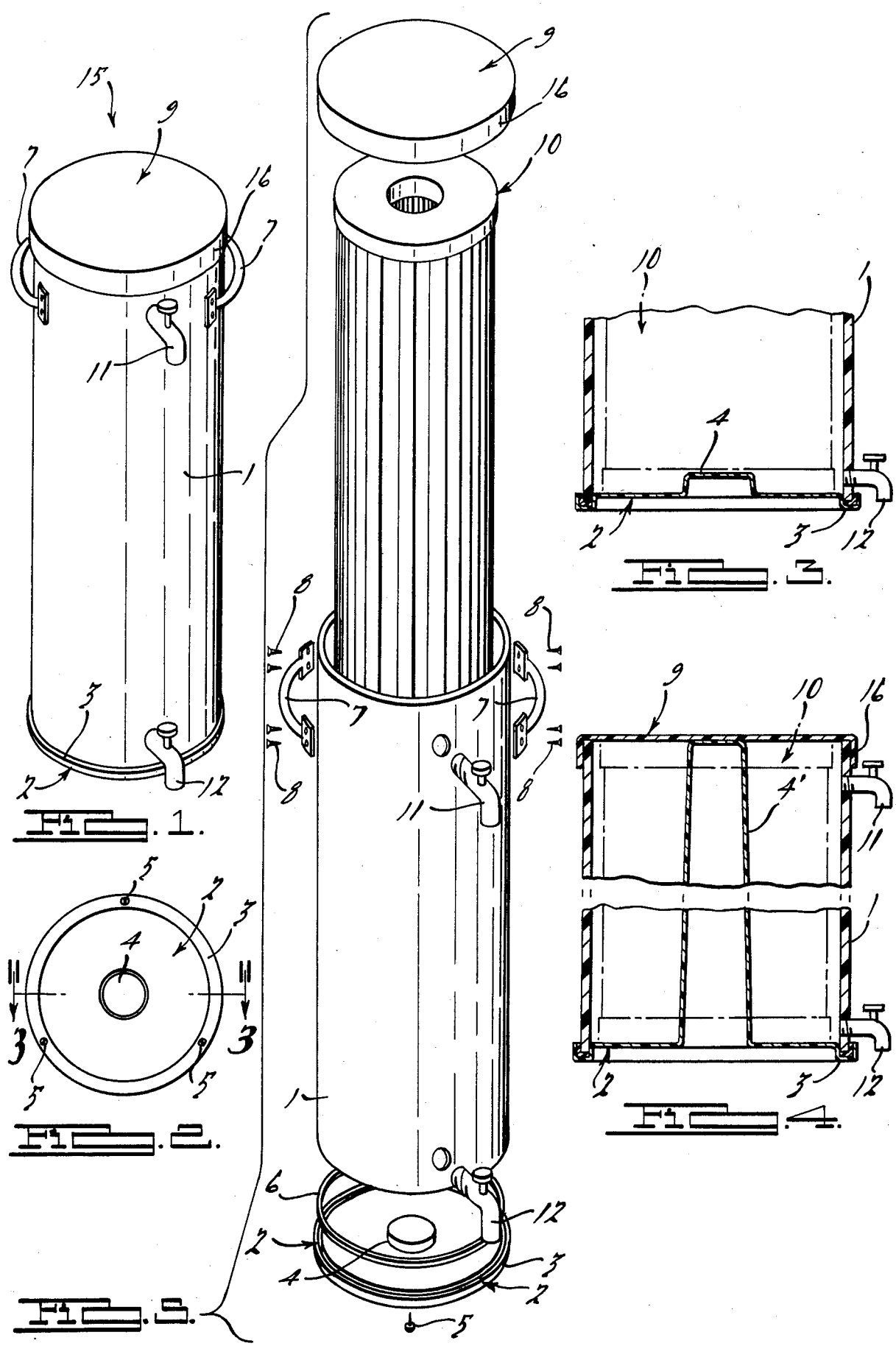

CLEANING FLUID VESSEL FOR IMMERSION OF CARTRIDGE-TYPE FILTER MEDIA

BACKGROUND AND SUMMARY OF THE INVENTION

The present invention relates to vessels for use in cleaning filter media and is more particularly directed to vessels for cleaning cartridge-type filter media having an elongated axial dimension with a void central bore.

In particular, the present invention relates to vessels for immersion of cartridge-type filter media in a cleaning fluid. The embodiment of this invention includes a circuit of sides which closely conforms to the external periphery of the filter media and a bottom wall which has a raised central hub portion. Both the close conformity of the circuit of sides to the external periphery of the filter media and the raised central hub portion combine to minimize the amount of cleaning fluid required to achieve immersion of the filter media. In addition, the raised central hub portion provides an automatic centering means for locating and retaining the filter media within the vessel. The uppermost radial dimension and downwardly tapered profile of the raised central hub portion produces the automatic centering function. The taper expands in a downwardly direction ending at the intersection with the bottom wall. At this point, the raised central hub portion has an outside radial dimension slightly less than the inside radial dimension of the void central bore of the cartridge-type filter media.

A further feature of the invention is both a draining means and a tapping means. The draining means allows the entire vessel to be purged of cleaning fluid as well as permitting the cleaning fluid vessel to be connected to a source of compressed air which may be used to impart agitation to the cleaning fluid. The tapping means allows draining of the topmost portion of cleaning fluid containing high concentration of floating materials which have been removed from the filter media. Another object of the invention is to provide a removable lid member which allows control over fume release, minimizes spillage during handling, and minimizes accidental contacts with the cleaning fluid.

Additional objects and advantages of the present invention will become apparent from a reading of the detailed description of the preferred embodiment which makes reference to the following set of drawings.

BRIEF DESCRIPTION OF THE DRAWING

FIG. 1 is a perspective view of the cleaning fluid vessel;

FIG. 2 is a bottom view of the cleaning fluid vessel;

FIG. 3 is a cross-section view taken along Line 3—3 of FIG. 2 revealing the lower portion of the cleaning fluid vessel;

FIG. 4 is a cross-section view taken along Line 3—3 of FIG. 2 revealing a view of the lower portion and top portion of the cleaning fluid vessel constructed in accordance with an alternative satisfactory embodiment of the present invention; and FIG. 5 is an exploded perspective view of the cleaning fluid vessel also showing a cartridge-type filter media.

DETAILED DESCRIPTION OF THE PREFERRED EMBODIMENT

Referring now to the drawing wherein FIGS. 1–5 illustrate an embodiment of a cleaning fluid vessel for cartridge-type filter media.

It may be seen that the embodiment of the cleaning fluid vessel 15 consists of an outer circuit of sides 1, a bottom member 2, opposing handles 7, a lid member 9, tapping means 11, and draining means 12, all constructed of a material resistant to corrosion from a cleaning agent. The outer circuit of sides 1 is constructed from a tube-type member by having ends cut along an axis perpendicular to the central axis of the circuit of sides 1. The bottom member 5 and lid member 9 are both constructed of materials which may be formed into the desired shape preferably by a molding or stamping process. The bottom member 5 has a peripheral indention 3 shaped to receive fasteners 5, sealer 6, and the circuit of sides 1.

The bottom member 2 includes a raised central hub portion 4 which has a downwardly tapered profile with an uppermost radial dimension which is less than the inside radial dimension of the cartridge-type filter media 10 to be cleaned. The uppermost radial dimension of the raised central hub portion has been selected so that upon insertion of a cartridge-type filter media 10 the cartridge-type filter media 10 is not obstructed by contact with the raised central hub portion 4. Such a dimension has been determined by adding the cartridge-type filter media 10 respective outside radial dimension and the cartridge-type filter media 10 respective inside radial dimension, minus the respective inside radial dimension of the circuit of sides. The raised central hub portion taper extends downwardly from the topmost portion thereof to the intersection with the bottom wall 2 at which point the outside radial dimension of the raised central hub portion 4 is slightly less than the respective inside radial dimension of the cartridge-type filter media 10. A tapered profile having such dimensions will provide automatic centering of the cartridge-type filter media 10. In addition, the raised central hub portion 4 displaces unnecessary cleaning fluid volume from the central bore of the cartridge-type filter media 10 thereby minimizing the amount of cleaning fluid required to realize immersion of the cartridge-type filter media 10.

In a further embodiment, the bottom member 2 includes a raised central hub portion 4' as best seen in FIG. 4, having generally identical respective dimensional characteristics as that of the preferred embodiment, which extends upwardly ending at the topmost portion of the circuit of sides 1.

Draining means 12 and tapping means 11, preferably consist of petcock-type valves threadably received by the circuit of sides 1. The draining means 12 allows the entire vessel to be purged of cleaning fluid. The draining means 12 may also be used to eliminate that portion of cleaning fluid near the bottom which has a high concentration of settleable materials which have been removed from the filter media 10. In addition, the draining means 12 may receive a fitting connecting the cleaning fluid vessel to a source of compressed air which may be used to impart agitation to the cleaning fluid thereby reducing the time required to realize the cleaning process. The tapping means 11 may be used to remove that cleaning fluid near the top of the cleaning fluid vessel 15 which has a high concentration of floating materials which have been removed from the filter media 10.

In the preferred embodiment, the bottom member 2 is assembled to the circuit of sides 1 preferably by self-threaded fastening means 5 and liquid applied sealing means 6 as best seen in FIGS. 2 and 5. The opposing handles 7 are attached to the circuit of sides 1 preferably by self-threaded fastening means 8. The lid member 9 preferably has a lip portion 16 which is slidably engagable with the circuit of side 1. The lid member 9 may also be locked to the circuit of sides 1 by locking means such as an elastic cord drawn over the lid member 9 and attached to opposing handles 7.

In a further embodiment the bottom wall 2 and the circuit of sides 1 may be constructed of one continuous material.

It is contemplated that many variations of shape, size, and in the materials which can be used are within the spirit of the invention disclosed in the above specification. Accordingly, it is to be understood that the scope of the present invention is not to be limited by the specific illustrative examples shown and described here but rather by the scope of the language of the appended claims.

What is claimed is:

1. A cleaning fluid vessel for immersion of cartridge-type filter media therein, comprising:
   a circuit of sides having a means defining a top and a bottom opening aligned perpendicularly to the central axis of said circuit of sides; the interior surface of said circuit of sides conforming to the peripheral contour of a cartridge-type filter media;
   a bottom wall in contact with said means defining a bottom opening of said circuit of sides; said bottom wall having a raised central hub portion having a decreasingly upward tapered profile with an uppermost radial dimension less than said cartridge-type filter media inside radial dimension, and wherein said decreasingly upward tapered profile ends at the intersection with said bottom wall with an outside radial dimension less than the respective inside radial dimension of said cartridge-type filter media;
   a removable lid member which contacts the top plane of said circuit of sides; and
   said circuit of sides, said bottom wall, said lid member being resistant to corrosion from said cleaning fluid.

2. A cleaning fluid vessel for immersion of a cartridge-type filter media as recited in claim 1 wherein said lid member has a lip portion slidably engagable with the top portion of said periphery of said circuit of sides.

3. A cleaning fluid vessel for immersion of a cartridge-type filter media as recited in claim 1 wherein said raised central hub portion extends to the top portion of said circuit of sides.

4. A cleaning fluid vessel for immersion of a cartridge-type filter media therein, comprising:
   a circuit of sides having a means defining a top and a bottom opening aligned perpendicularly to the central axis of said circuit of sides and wherein the interior surface of said circuit of sides conforms to a peripheral contour defined by a cartridge-type filter media;
   a bottom wall in contact with said means defining a bottom opening of said circuit of sides, said bottom wall having a raised central hub portion extending to the top portion of said circuit of sides;
   said raised central hub comprising a decreasingly upward tapered portion having an uppermost radial dimension less than said cartridge type filter media inside radial dimension, wherein said taper ends at the intersection of said bottom wall with an outside radial dimension less than the respective inside radial dimension of said cartridge-type filter media;
   a removable lid member which contacts the top plane of said circuit of sides, said lid member having a lip portion slidably engageable with the top portion of said periphery of said circuit of sides;
   a valve means disposed upon the lower portion of said circuit of sides whereby said vessel may be purged of cleaning fluids;
   a valve means disposed upon the upper portion of said circuit of sides whereby the topmost portion of said vessel may be purged of cleaning fluid; and
   said circuit of sides, said bottom wall, said lid member, said draining means, and said tapping means being resistant to corrosion from said cleaning fluid.

* * * * *